July 2, 1968 R. J. BROADMAN ETAL 3,390,547

DRIVE FOR INDICATING INSTRUMENT SUCH AS A TACHOMETER

Filed Feb. 7, 1966

INVENTORS
RICHARD J. BROADMAN
RICHARD D. MAY
BY
James and Franklin
ATTORNEY

United States Patent Office 3,390,547
Patented July 2, 1968

3,390,547
DRIVE FOR INDICATING INSTRUMENT
SUCH AS A TACHOMETER
Richard J. Broadman and Richard D. May, Westport, Conn., assignors to Jones Motrola Corporation, Stamford, Conn., a corporation of Connecticut
Filed Feb. 7, 1966, Ser. No. 525,735
2 Claims. (Cl. 64—27)

ABSTRACT OF THE DISCLOSURE

An indicating instrument in which there is interposed between the input and the output a combination of a resilient rotation transmitting means and stop means cooperable therewith, the stop means normally being out of engagement with one another but moving into engagement with one another when the resilient rotation transmitting means is appropriately stressed.

---

The present invention relates to a drive for an indicating instrument such as a tachometer which will be relatively insensitive to minor variations in the input, thereby producing a relatively constant output indication under those circumstances, but which is rapidly and accurately responsive to significant input changes, thereby to provide prompt indication thereof. The present invention has been specifically designed for use in a device (e.g. a tachometer) designed to indicate rates, but it is capable of other uses as well.

A tachometer is a device which measures and indicates rate of rotation. One general form which such instruments take is to have the rotated shaft drive a centrifugally sensitive assembly, that assembly being connected to a dial on which is indicated the relative positions of portions of the centrifugally sensitive assembly. In some instances a high and constant degree of accuracy and sensitivity is required in tachometers, but in other instances (e.g. speedometers or engine revolution indicators in motor vehicles) steadiness of indication is a prime consideration, and slight or rapid fluctuations in speed should not be indicated. It is with regard to this latter type of instrument that the present invention finds its main applicability.

Insensitivity to rapid and/or minor speed input changes can be obtained by coupling the input shaft to the centrifugally sensitive device through a spring, the resiliency of the spring taking up and damping out such variations. The degree to which these variations will be thus eliminated will depend upon the stiffness of the spring; the weaker the spring, the better will the spring coupling perform this smoothing function.

However, the weaker the spring, the less sensitive (both as to accuracy and speed of response) will the instrument be to extreme input changes or to input changes of appreciable magnitude which occur suddenly or quickly. Yet such extreme or rapid input changes are usually the very type of conditions which must be brought to the attention of the person in charge (e.g. the operator of the motor vehicle) as rapidly and accurately as possible, since they usually indicate the existence of some condition which requires immediate supervision (e.g. the spinning of a wheel at the beginning of a skid).

Thus the decoupling of the input and indicator by means of a spring has in the past been characterized by a compromise which has, for the most part, made such decoupling virtually pointless. If the spring is weak enough to provide effective damping-out of rapid minor fluctuations, it is also so weak as to produce an excessive delay in indication of extreme or emergency conditions. Conversely, if the spring is stiff enough so that the instrument would act properly in extreme or emergency conditions, the smoothing of rapid minor fluctuations which it carried out is minimal in extent.

A prime object of the present invention is to provide a spring decoupling system which will eliminate the necessity for the compromise which has heretofore been thought inevitable. The system of the present invention will smooth out minor input variations to a truly significant degree, thus producing a steady indicator output under those conditions, but it will also give virtually instantaneous indication of extreme input variations, and without any appreciable loss of accuracy.

In accordance with the present invention, a weak spring, which is preferably in the form of a helix or coil wrapped around the input shaft and radially spaced therefrom over substantially the entire length of the spring, is utilized to couple the input element (usually a shaft) to a driven part which rotates with the input shaft but is not fast thereon—it has a degree of freedom of rotation relative thereto—and which functions as a motion transmitting member. The spring normally retains said member in a predetermined rotative position relative to the input element, but the relative rotative positions of the two can change against the resilient action of the spring. Since the spring is weak, minor variations in rotational speed of the input element will be damped out before they reach the motion transmitting member. In addition, stop means are provided which positively limit the freedom of rotation of said member relative to the input element to a degree less than that normally permitted by the spring, such as to less than 180 degrees. Any tendency of the input element and said member to rotate relatively more than that predetermined arc will be positively prevented by engagement of the stop means, the input element and said member thereafter being positively connected together for simultaneous and commensurate rotation. Thus if a large change in input rotational speed should occur, or if a smaller change should occur very rapidly, producing a large input torque, the coupling spring will yield until the stop means engage. This will occur with extreme rapidity because of the weakness of the spring. Thereafter, because of the positive drive produced by the stop means, the indicator will give a virtually instantaneous and accurate indication of the input condition. On the other hand, small variations in input speed, or variations which occur slowly, will be largely damped out by the coupling spring, thereby producing a steady indication.

To the accomplishment of the above, and to such other objects as may hereinafter appear, the present invention relates to an indicating instrument such as a tachometer having an improved input drive therefor, as defined in the appended claims and as described in this specification, taken together with the accompanying drawings, in which:

Figure 1:
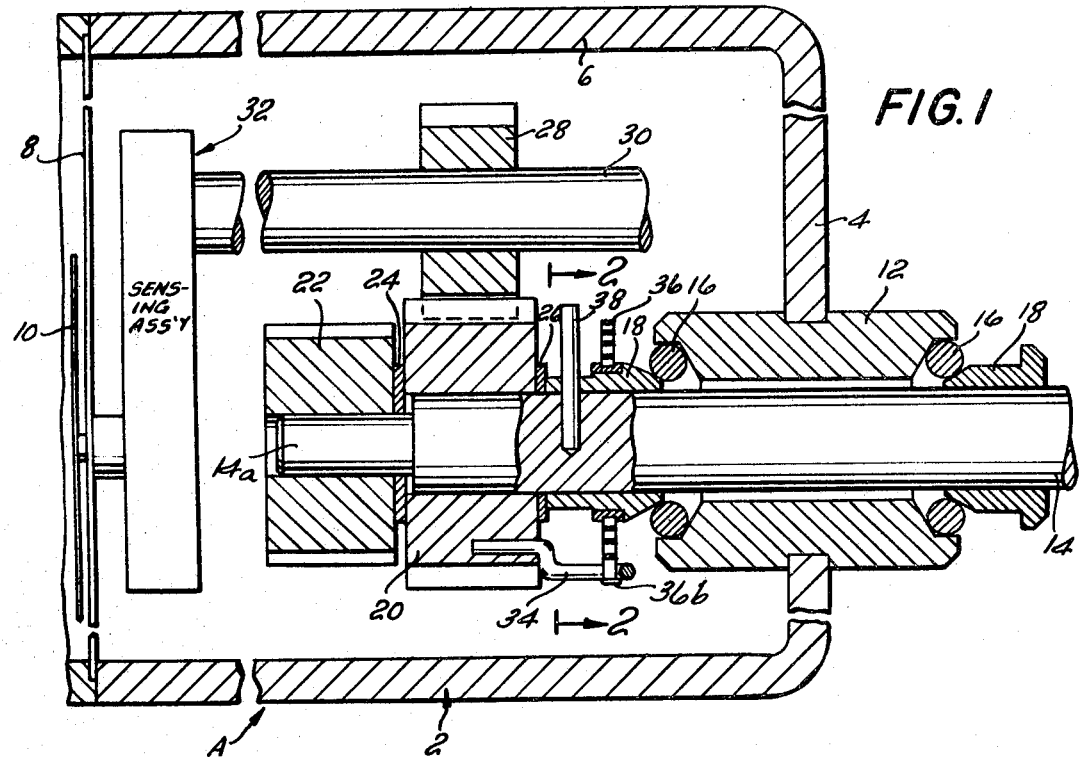
FIG. 1 is an idealized cross sectional view of a typical indicating instrument incorporating one embodiment of the present invention.

A represents an idealized indicating instrument having a casing 2 with a rear wall 4, a side wall 6 and a front dial 8 over which an indicating hand 10 is adapted to be moved. A bearing sleeve 12 is mounted in the rear wall 4 of the casing 2, and an input element in the form of shaft 14 is rotationally received therein, as by means of the bearing balls 16 which act upon bearing cones 18 made fast to the shaft 14. The shaft carries an element in the form of a gear 20 which is held axially in place on the shaft 14 by means of sleeve 22 press fitted onto the shaft end 14a, washers 24 and 26 being interposed between the element 20 and the sleeve 22 and bearing cone 18 respectively. The gear 20 meshes with gear 28 fast on shaft 30, thereby functioning as a motion transmitting member, the shaft 30 driving a sensing assembly generally designated 32, which senses the input thereto provided by the shaft 30 and positions the indicator hand 10 accordingly. It will be understood that the disclosure in FIG. 1 is idealized in form (except insofar as it relates to the specifics of the driving arrangement hereinafter to be described). In a typical form the instrument A may comprise a tachometer, the sensing assembly 32 comprising some device sensitive to speed of rotation, e.g. a centrifugally actuated governor, the details of which form no part of the present invention and with respect to which many different effective constructions are known.

Figure 2:
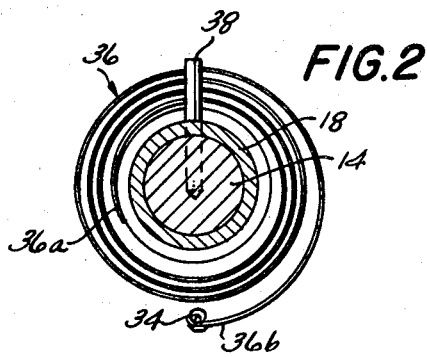
FIG. 2 is a cross sectional view taken along the line 2—2 of FIG. 1.

The motion-transmitting member or gear 20 is not fast on the shaft 14, but floats thereon, and therefore is rotatable relative thereto. A pin 34 extends axially out from the body of the gear 20 at a position such as to extend along the adjacent bearing cone 18, but to be radially spaced therefrom. A coupling spring 36 connects the pin 34 and said cone 18, that spring 36 being in the form of a spiral hairspring one end 36a of which is secured to said bearing cone 18 and the other end 36b of which is secured to the pin 34. The spring 36, over substantially all of its length, is radially spaced from the shaft 14 and the bearing cone 18, so that it can function resiliently to normally retain the driven element 20 in a given rotational position on the shaft 14, that normal rotational position being shown in FIGS. 1 and 2. The spring 36 will, however, yield in response to forces exerted thereon so as to permit relative rotation of the gear 20 with respect to the shaft 14 in either direction from that normal position, depending upon the direction of the force exerted.

The shaft 14 carries a radially extending pin 38, which, as here specifically disclosed, extends from the shaft 14 at a position diametrically opposed to that of the pin 34 when the driven element 20 is in its normal position as urged by the spring 36. The pin 38 extends out radially from the shaft 14 to a distance beyond the pin 34, and the pin 34 extends axially from the gear 20 to a position beyond the pin 38. The pins 34 and 38 thus constitute stop means which are engageable when the gear 20 rotates relative to the shaft 14 slightly less than 180 degrees in either direction from its normal rotative position.

During steady state operation of the device, with the input shaft 14 rotating at a uniform speed, rotation thereof will be transmitted to the gear 20 through the spring 36, the gear 20 in turn actuating the sensing assembly 32 via the gear 28 and shaft 30. For as long as the input speed remains constant the gear 20 will be approximately in its normal intermediate position, the spring 36 being deflected only to a liimted degree, and the stop pins 34 and 38 being appreciably rotatively spaced from one another. Slight rapid variations in input speed will be damped out by the spring 36, which is relatively weak, the gear 20 rotating relative to shaft 14 against the action of said spring, therefore not affecting the position of the indicator hand 10 to any appreciable degree. However, if a large input speed change should occur, or if a smaller input speed change should occur very rapidly, the gear 20 will rotatively lag relative to the shaft 14, the spring 36 will be deflected until pin 38 comes into contact with pin 34, and then the input shaft 14 will positively drive the gear 20, with no damping being interposed therebetween. Hence the indicator hand 10 will be quickly and accurately moved to its new position. When the rapid change disappears the system will return to equilibrium, the gear 20 rotating ahead relative to the shaft 14 while it rotates therewith so as to return substantially to its normal position as urged by the spring 36.

From the above it will be seen that the spring 36 may be made as weak as desired, so as to produce the desired degree of damping, without any sacrifice in the accuracy or speed of response of the instrument to significant input changes.

Figure 4:
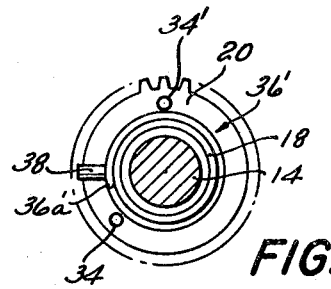
FIG. 4 is a cross sectional view taken along the line 4—4 of FIG. 3.
Figure 3:
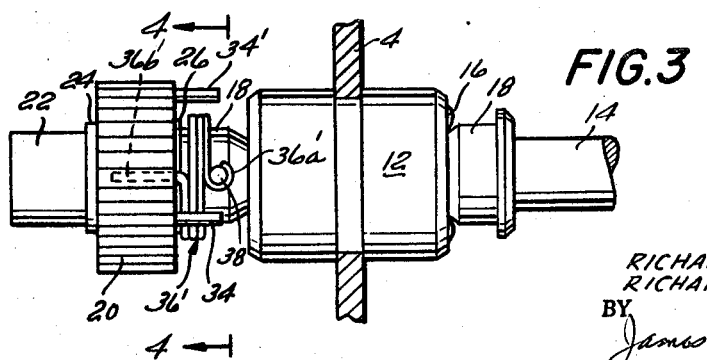
FIG. 3 is a fragmentary side elevational view of a portion of a drive mechanism incorporating a second embodiment of the present invention.

FIGS. 4 and 5 illustrate an alternative embodiment of the drive system of the present invention. It differs from the embodiment of FIGS. 1 and 2 primarily in the manner in which the spring is constructed and mounted and the fact that the stop means are so arranged as to limit the relative rotation of gear 20 and shaft 14 to appreciably less than 180 degrees. Thus the spring 36' is in the form of a helix, one end 36a' of which is secured to the pin 38 which extends radially from the shaft 14, the other end 36b' of which is bent so as to extend axially and be within an opening in the gear 20. Extending axially from the gear 20 are a pair of stop pins 34 and 34', separated from one another by any desired angle such as 120 degrees, the stop pin 38 carried by the shaft 14 being received between the pins 34 and 34'. The normal relative rotative position of the gear 20 with respect to the shaft 14 may place the pin 38 midway between the pins 34 and 34', thus providing for equal degrees of sensitivity for either direction of rotation, but this is not essential. Indeed, as shown in FIGS. 3 and 4, the pin 38, with the parts in their normal condition, is closer to pin 34 than to pin 34', thus permitting a greater degree of damping for clockwise rotation of the shaft 14 (as viewed in FIG. 4) than for counter-clockwise rotation.

The structure of the present invention will be seen to be simple and reliable yet, as has been described, it permits the attainment of a desired degree of damping or looseness of coupling for minor or slowly occurring changes in input without any appreciable sacrifice in accuracy or speed of response in conection with major or quickly occurring changes in input.

While but a limited number of embodiments of the present invention have been here specifically disclosed, it will be apparent that many variations may be made therein, all within the scope of the present invention as defined in the following claims.

We claim:

1. In a drive for an indicating instrument such as a tachometer, said drive comprising an input element, a driven element, an operative connection therebetween, indicator means, and an operative connection between said driven element and said indicator means; the improvement in said operative connection between said input element and said driven element which comprises a motion transmitting member operative connected to one of said elements and rotatable relative thereto, rotation transmitting means comprising a spring operatively connected between said member and said element, said means normally resiliently retaining said member and said element in a given relative rotational position but permitting departure from said relative rotational position against the resiliency of said spring, and stop means on said member and element respectively engageable when said member has rotated through a predetermined arc relative to said element, said stop means normally being spaced from and out of engagement with one another under the influence of said spring, said stop means extending from said member and element respectively in directions at right angles to one another to intersection positions, and said spring being operatively connected to one of said member and element via the corresponding stop means, said motion-transmitting member being on said input element and a bearing part fast on said input element and having a conical bearing surface adapted to cooperate with a fixed bearing, the element-connected end of said spring being operatively connected to said bearing part.

2. The drive of claim 1, in which said element-associated stop means is mounted on said bearing part and said element-connected end of said spring is connected to said stop means.

References Cited

UNITED STATES PATENTS

| | | | |
|---|---|---|---|
| 1,146,495 | 7/1915 | Hamel | 64—27 |
| 1,162,034 | 11/1915 | Catucci | 64—27 |
| 1,195,765 | 8/1916 | Bastian | 64—27 |
| 1,700,881 | 2/1929 | Cassel. | |

FOREIGN PATENTS 915,625  7/1954  Germany.

HALL C. COE, *Primary Examiner.*